United States Patent

Mohanty et al.

(10) Patent No.: US 12,367,655 B2
(45) Date of Patent: Jul. 22, 2025

(54) AUTOMATICALLY CLASSIFYING IMAGES FOR STORAGE-RELATED DETERMINATIONS USING ARTIFICIAL INTELLIGENCE TECHNIQUES

(71) Applicant: Dell Products L.P., Round Rock, TX (US)

(72) Inventors: Bijan Kumar Mohanty, Austin, TX (US); Divya Maddi, Round Rock, TX (US); Hung T. Dinh, Austin, TX (US)

(73) Assignee: Dell Products L.P., Round Rock, TX (US)

(*) Notice: Subject to any disclaimer, the term of this patent is extended or adjusted under 35 U.S.C. 154(b) by 471 days.

(21) Appl. No.: 17/724,638

(22) Filed: Apr. 20, 2022

(65) Prior Publication Data

US 2023/0343067 A1  Oct. 26, 2023

(51) Int. Cl.
*G06V 10/764* (2022.01)
*G06F 16/51* (2019.01)
*G06V 10/44* (2022.01)
*G06V 10/82* (2022.01)

(52) U.S. Cl.
CPC ............ *G06V 10/764* (2022.01); *G06F 16/51* (2019.01); *G06V 10/454* (2022.01); *G06V 10/82* (2022.01)

(58) Field of Classification Search
CPC ..... G06V 10/764; G06V 10/454; G06V 10/82
See application file for complete search history.

(56) References Cited

U.S. PATENT DOCUMENTS

| | | | |
|---|---|---|---|
| 10,395,772 B1 | 8/2019 | Lucas | |
| 10,891,485 B2* | 1/2021 | Anorga | G06V 30/413 |
| 11,188,746 B1 | 11/2021 | Patel | |
| 11,410,409 B2* | 8/2022 | Kigawa | G06F 18/214 |
| 2010/0138459 A1* | 6/2010 | Kasmirsky | G06F 16/435 |
| | | | 707/812 |
| 2010/0332401 A1* | 12/2010 | Prahlad | G06F 3/0641 |
| | | | 711/E12.001 |
| 2013/0132959 A1 | 5/2013 | Moore | |
| 2014/0258283 A1 | 9/2014 | Charng | |
| 2014/0293069 A1* | 10/2014 | Lazar | H04N 23/6811 |
| | | | 382/165 |
| 2016/0147954 A1* | 5/2016 | Ng Tari | G16H 40/20 |
| | | | 705/3 |

(Continued)

FOREIGN PATENT DOCUMENTS

CN     108415666 A  *  8/2018

*Primary Examiner* — Jennifer Mehmood
*Assistant Examiner* — Sebastian-Sy Vuchi Ngo
(74) *Attorney, Agent, or Firm* — Ryan, Mason & Lewis, LLP

(57) ABSTRACT

Methods, apparatus, and processor-readable storage media for automatically classifying images for storage-related determinations using artificial intelligence techniques are provided herein. An example computer-implemented method includes obtaining at least one image associated with an enterprise; classifying one or more portions of the at least one image into one or more enterprise-related categories by processing at least a portion of the at least one image using one or more artificial intelligence techniques; and performing, based at least in part on the classifying of the one or more portions of the at least one image, one or more automated actions pertaining to storing the at least one image in at least one of multiple storage options.

20 Claims, 11 Drawing Sheets

(56) References Cited

U.S. PATENT DOCUMENTS

| | | |
|---|---|---|
| 2020/0226288 A1 | 7/2020 | Zhang |
| 2021/0224744 A1* | 7/2021 | Selvaraju ............... G06N 3/045 |
| 2022/0027611 A1 | 1/2022 | Yu et al. |
| 2022/0044358 A1 | 2/2022 | Wang et al. |
| 2022/0058383 A1 | 2/2022 | Seth |
| 2022/0067902 A1 | 3/2022 | Dou et al. |
| 2022/0101040 A1 | 3/2022 | Zhang et al. |
| 2022/0222481 A1 | 7/2022 | Mohanty |
| 2022/0253645 A1 | 8/2022 | Lin |
| 2022/0335203 A1 | 10/2022 | Van Dyke |
| 2023/0305863 A1 | 9/2023 | Riva |

\* cited by examiner

FIG. 6

```
# Importing necessary libraries
import tensorflow as tf
from keras.preprocessing.image import ImageDataGenerator
from keras.models import Sequential
from keras.layers import Conv2D, MaxPooling2D
from keras.layers import Activation, Dropout, Flatten, Dense import numpy as np
import pandas as pd
import matplotlib.pyplot as plt
```

FIG. 7

```
X_dataset = np.load("/content/drive/My Drive/images.npy")
Y_dataset= pd.read_csv("/content/drive/My Drive/Labels.csv")
```

FIG. 8

```
# Convert labels to one-hot-vectors
from sklearn.preprocessing import LabelBinarizer enc = LabelBinarizer()
Y_encoded = enc.fit_transform(Y_dataset)
```

FIG. 9

```
# Split the dataset into training, testing, and validation data sub-sets.
from sklearn.model_selection import train_test_split

# First split Train data sub-set and Test data sub-set as 70 - 30 split
X_train, X_test, y_train, y_test = train_test_split(X_dataset, Y_encoded, test_size=.3, random_state=42)

# Split Test data sub-set into test and validation sub-sets as 50-50
X_test, X_validation, y_test, y_validation = train_test_split(X_test, y_test, test_size=.5, random_state=42)
```

FIG. 10

```
from tensorflow.keras import datasets, models, layers, optimizers model = models.Sequential()

First CNN layer with 32 filters with size of 5 by 5
model.add(layers.Conv2D(32, (5, 5), padding='same', activation="relu",
input_shape=X_train.shape[1:]))
model.add(layers.BatchNormalization())
model.add(layers.MaxPooling2D((2, 2)))
model.add(layers.Dropout(0.2))

# Second CNN layer with 64 filters with size of 5 by 5
model.add(layers.Conv2D(64, (5, 5), padding='same', activation="relu"))
model.add(layers.BatchNormalization())
model.add(layers.MaxPooling2D((2, 2)))
model.add(layers.Dropout(0.3))

# Third CNN layer with 64 filters with size of 3 by 3
model.add(layers.Conv2D(64, (3, 3), padding='same', activation="relu"))
model.add(layers.BatchNormalization())
model.add(layers.MaxPooling2D((2, 2)))
model.add(layers.Dropout(0.4))

# Fourth CNN layer with 128 filters with size of 3 by 3
model.add(layers.Conv2D(128, (3, 3), padding='same', activation="relu"))
model.add(layers.BatchNormalization())
model.add(layers.MaxPooling2D((2, 2)))
model.add(layers.Dropout(0.5))

(cont. in 1000-b)
```

1000-a

```
(cont. from 1000-a)

# Reduce dimension and flatten the output from CNN layers
model.add(layers.GlobalMaxPooling2D())

# Create a Dense neural network for classification task
model.add(layers.Dense(256, activation="relu"))
model.add(layers.Dropout(0.5))

# Create an output layer with 12 Neurons for 12 classes of Labels
model.add(layers.Dense(12, activation="softmax"))

# Let's use adam optimizer and categorical cross entropy loss function
# initiate Adam optimizer
opt = optimizers.Adam(learning_rate=0.001, beta_1=0.9,
beta_2=0.999, epsilon=1e-08)

model.compile(loss='categorical_crossentropy',
              optimizer=opt,
              metrics=['accuracy'])
```

```
# Set the batch size, number of epochs.
batch_size = 32
num_classes = 12
epochs = 50
num_predictions = 20 if the val_loss is not going to change even '0.001' for more than 10 continuous epochs
from tensorflow.keras.callbacks import ModelCheckpoint, EarlyStopping early_stopping = EarlyStopping(monitor='val_loss', min_delta=0.001,
patience=10)

#Adding Model Checkpoint callback to the fit function is going to save weights
whenever val_loss achieves a new low value.
#Hence saving the best weights occurred during training
checkpoint_filepath = '/tmp/check_point'
model_checkpoint = ModelCheckpoint(filepath='checkpoint_filepath',
                monitor='val_loss',
                verbose=1,
                save_best_only=True,
                save_weights_only=True,
                mode='auto',
                save_freq=1)

(cont. in 1100-b)
```
1100-a

```
(cont. from 1100-a)

# Fit the model with the training data
history = model.fit(X_train,
        y_train,
        batch_size=batch_size,
        epochs=epochs,
        validation_data=(X_validation, y_validation),
        shuffle=True,
        verbose=1,
        callbacks=[early_stopping, model_checkpoint])

# plot training history
plt.plot(history.history['loss'], label='train')
plt.plot(history.history['val_loss'], label='validation')
plt.legend()
plt.show()
```
1100-b

AUTOMATICALLY CLASSIFYING IMAGES FOR STORAGE-RELATED DETERMINATIONS USING ARTIFICIAL INTELLIGENCE TECHNIQUES

FIELD

The field relates generally to information processing systems, and more particularly to techniques for data storage using such systems.

BACKGROUND

Images are a common form of information exchange for various enterprise activities (e.g., customer service requests, sales and marketing material, internal team collaborations, etc.). However, because image data often consume significant amounts of storage, cloud storage of such data can become resource-intensive and/or cost-prohibitive. In addition to these limitations, conventional image data storage approaches typically lack targeted organizational capabilities, resulting in time-intensive searching efforts when particular data are sought for one or more enterprise purposes.

SUMMARY

Illustrative embodiments of the disclosure provide techniques for automatically classifying images for storage-related determinations using artificial intelligence techniques. An exemplary computer-implemented method includes obtaining at least one image associated with an enterprise, and classifying one or more portions of the at least one image into one or more enterprise-related categories by processing at least a portion of the at least one image using one or more artificial intelligence techniques. The method also includes performing, based at least in part on the classifying of the one or more portions of the at least one image, one or more automated actions pertaining to storing the at least one image in at least one of multiple storage options.

Illustrative embodiments can provide significant advantages relative to conventional image data storage approaches. For example, problems associated with resource-intensive storage of image data and time-intensive searching requirements associated with such stored data are overcome in one or more embodiments through automatically classifying images in connection with enterprise-related storage determinations using artificial intelligence techniques.

These and other illustrative embodiments described herein include, without limitation, methods, apparatus, systems, and computer program products comprising processor-readable storage media.

BRIEF DESCRIPTION OF THE DRAWINGS

FIG. 6 shows an example code snippet for data preprocessing in an illustrative embodiment.

FIG. 7 shows an example code snippet for loading training images and labels in an illustrative embodiment.

FIG. 8 shows an example code snippet for converting labels into vectors in an illustrative embodiment.

FIG. 9 shows an example code snippet for processing datasets in an illustrative embodiment.

FIG. 10 shows example code snippets for building a CNN model in an illustrative embodiment.

FIG. 11 shows an example code snippet for training and implementing a CNN model in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
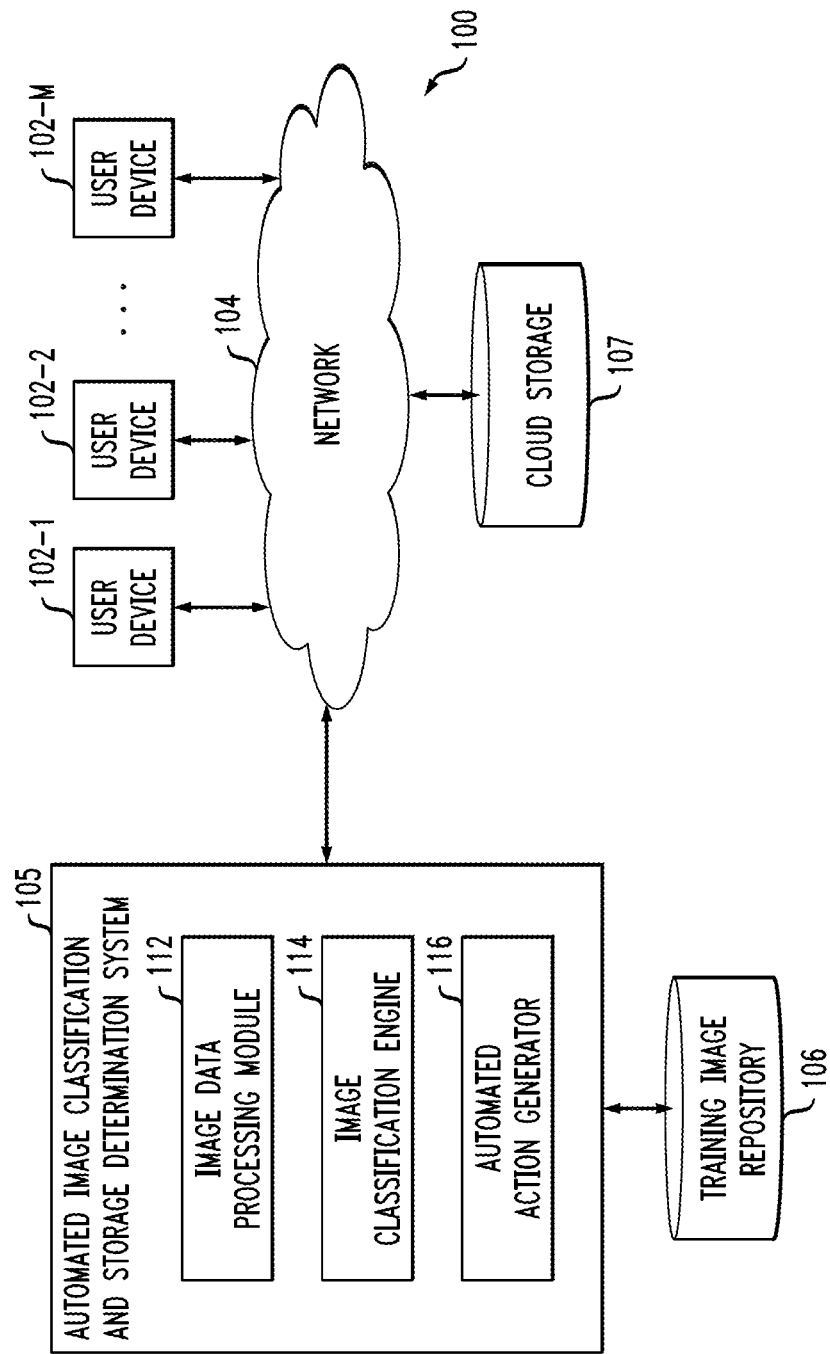
FIG. 1 shows an information processing system configured for automatically classifying images for storage-related determinations using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated image classification and storage determination system 105 and cloud storage 107 (which can be associated, for example, with one or more of the user devices 102).

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated image classification and storage determination system 105 can have an associated training image repository 106 configured to store data pertaining to training one or more artificial intelligence techniques as part of image classification engine 114.

The training image repository 106 in the present embodiment is implemented using one or more storage systems associated with automated image classification and storage determination system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated image classification and storage determination system 105 are one or more input-output devices, which illustratively comprise keyboards, displays or other types of input-output devices in any combination. Such input-output devices can be used, for example, to support one or more user interfaces to automated image classification and storage determination system 105, as well as to support communication between automated image classification and storage determination system 105 and other related systems and devices not explicitly shown.

Additionally, automated image classification and storage determination system 105 in the FIG. 1 embodiment is assumed to be implemented using at least one processing device. Each such processing device generally comprises at least one processor and an associated memory, and implements one or more functional modules for controlling certain features of automated image classification and storage determination system 105.

More particularly, automated image classification and storage determination system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated image classification and storage determination system 105 to communicate over the network 104 with the user devices 102, and illustratively comprises one or more conventional transceivers.

The automated image classification and storage determination system 105 further comprises image data processing module 112, image classification engine 114, and automated action generator 116.

It is to be appreciated that this particular arrangement of elements 112, 114 and 116 illustrated in automated image classification and storage determination system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automatically classifying images for storage-related determinations using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated image classification and storage determination system 105 and training image repository 106 can be on and/or part of the same processing platform.

An exemplary process utilizing elements 112, 114 and 116 of an example automated image classification and storage determination system 105 in computer network 100 will be described in more detail with reference to the flow diagram of FIG. 12.

Accordingly, at least one embodiment includes intelligent image data classification for searching and prioritized archiving. Such an embodiment includes implementing image data classification techniques which facilitate priority determinations for long-term management of at least a portion of the stored image data (e.g., selective image data archiving, migration of particular image data to cheaper storage, etc.).

Figure 2:
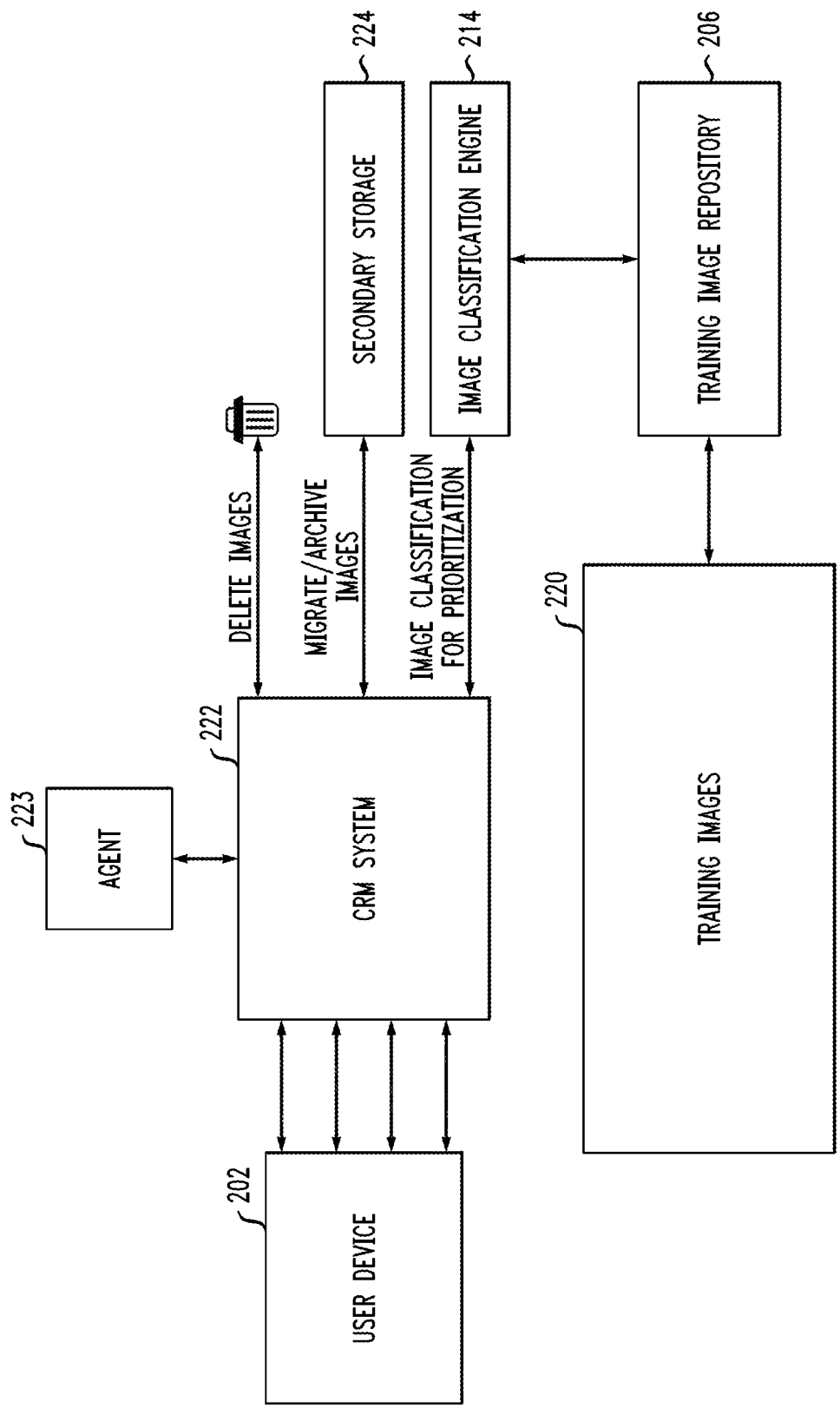
FIG. 2 shows an example workflow in an illustrative embodiment.

FIG. 2 shows an example workflow in an illustrative embodiment. By way of illustration, FIG. 2 depicts an image classification engine 214 implemented in connection with images, received as part of one or more enterprise objectives (e.g., product services lifecycles, etc.), by leveraging machine learning techniques (e.g., at least one deep neural network). Specifically, FIG. 2 depicts using training images 220 (e.g., images of products, shipment boxes, defects, communications, etc.), maintained and/or processed via a training image repository 206, to train a CNN comprised within image classification engine 214.

In one or more embodiments, image classification engine 214 automatically classifies at least a portion of the training images 220 into various categories or classes such as, for example, product-related, defect-related, shipment-related, communications-related, etc., and assigns at least one priority value to at least a portion of the images. Such actions can, for example, assist agents 223 associated with a customer relationship management (CRM) system 222 in making decisions on whether a given image received from a user device 202 can be deleted or migrated and archived to a secondary storage 224 (e.g., a less expensive storage on-premise). Such an embodiment can include reducing resource-intensive efforts related to manual searching and actions on individual images, and accelerating image management as well as reducing file storage cost (e.g., on the cloud).

As illustrated in FIG. 2, at least one embodiment includes building a training image repository 206 for the image classification engine 214. The images in this repository can come from, for example, product data systems for product images, CRM system 222 (e.g., for defect-related images and shipping-related images), etc. Similarly, images involving customer communication (email, chat, etc.) can be obtained from the CRM system 222 as well as historical cases having associated images. Such images can be classified into various categories with target labels such as product image, defect image, shipping image, communication image, etc. Additionally, in one or more embodiments, the data managed in the training image repository 206 can be used to train a CNN-based multi-class classifier (as part of image classification engine 214), subsequently used to predict the classes of input images.

As also depicted in FIG. 2 and further detailed herein, image classification engine 214 is responsible for classifying images such as, for example, images stored locally in CRM system 222 for each of multiple cases. In at least one embodiments, such cases are commonly stored in CRM system 222 for non-trivial periods of time (e.g., for compliance reasons) even after corresponding customer issues are resolved. Typically, all of the artifacts involving each such case are also commonly stored in the CRM system 222, including all images received from the customer(s). As images are often expensive to store, it can be imperative to understand the class and priority of each images such that a determination can be made as to delete a given image, migrate a given image to a cheaper storage medium, or maintain and/or archive a given image in a main (cloud) storage. In one or more embodiments, such a determination can be driven by the classification from image classification engine 214, which uses a multi-layer, customized CNN model, as further detailed in connection with FIG. 3.

Figure 3:
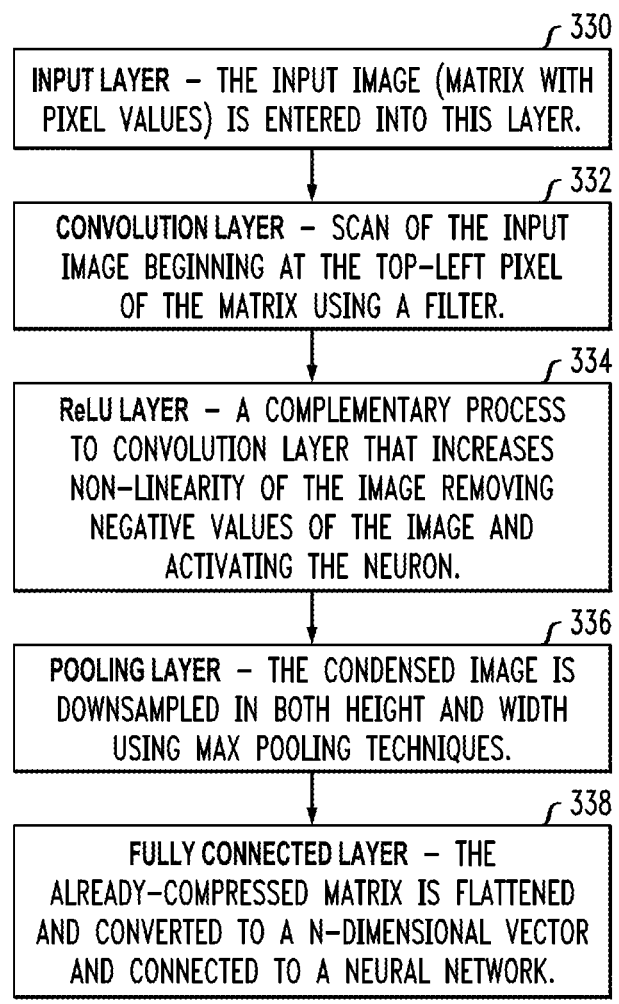
FIG. 3 shows an example workflow across image processing layers of a convolutional neural network (CNN) in an illustrative embodiment.

FIG. 3 shows an example workflow across image processing layers of a CNN in an illustrative embodiment. By way of illustration, FIG. 3 depicts sequential actions by an input layer, a convolution layer, a rectified linear unit (ReLU) activation layer, a pooling layer, and a fully connected layer. In at least one embodiment, an input image passes through these layers before the classifier can predict the class or category of the image. More specifically, as depicted in FIG. 3, step 330 includes entering, into the input layer, an input image which can include, for example, a matrix with pixel values, wherein the values can be in color (e.g., RGB) or grayscale. Accordingly, the pixel values in such a matrix can vary between 0-255 (for color values) or 0 and 1 (for grayscale values).

As also depicted in FIG. 3, step 332 includes scanning, using the convolution layer, the input image, beginning at the top-left pixel of the matrix. One or more embodiments include selecting a smaller matrix (than the input matrix), referred to herein as a filter (or a neuron, or a core), and using the filter to scan the input image matrix in a process referred to as convolution. While scanning through the image, the filter multiplies its values by the original pixel values. Additionally, in at least one embodiment, all of these multiplications are summed to calculate one value. Typically, images have a value on each pixel. For example, a grayscale image may have values of zero or one in the pixel, whereas a color image may have between 0-255 as the pixel value, matching the particular color on that pixel. Additionally, a filter can overlay on top of an image during convolution, and the pixel values can be multiplied with the filter values and/or summed to one number. As also detailed herein, the stride is the movement of the filter in the image (which can be, for example, one pixel, two pixels, etc.).

Further, because the filter starts at the top-left pixel, the filter moves further and further right by one unit (also referred to herein as a stride), performing a similar operation as detailed in the previous sentence(s). After passing the filter across all positions, a matrix is obtained which is smaller than the input image matrix. As such, step 332 includes condensing the image while keeping image features intact. Also, in one or more embodiments, the stride and size of the filter, which can vary over time, can be determined using a pretrained model (e.g., a CNN using a stride of one).

Step 334 includes a complementary process, performed by the ReLU layer, to the actions carried out by the convolution layer in step 332. Specifically, step 334 increases non-linearity of the image by removing negative values of the image and activating the neuron. More specifically, in one or more embodiments, ReLU is an activation function applied at each layer after computation. Accordingly, at each layer, the value is computed by passing the input value (x) to a function W*x+b, wherein W is the weight and b is the bias value. The computation from this formula can then be fed to the activation function to determine if the neuron will be activated or not. If the computed value at each layer is negative (e.g., due to bias or weight), the ReLU function will eliminate that value by converting it to 0. Such a step is similar, for example, to performing a Sigmoid function that facilitates a yes/no classification.

As also depicted in FIG. 3, step 336, carried out via the pooling layer, includes further downsampling the condensed image in both height and width by using max pooling techniques. By way of example, when a filter strides through an image and creates a convoluted feature, the dimension of the image gets reduced. For instance, consider a scenario wherein a 5×5 image was converted to a 3×3 image. This process is referred to as downsampling. Additionally, as noted above and further detailed herein, max pooling refers to a pooling process that selects the maximum value of the each patch of a feature map. Such actions take the maximum value of the matrix and further reduce the dimensionality (i.e., reduces the size) while retaining the feature map of the matrix. By way merely of illustration, an example embodiment can include using and/or adopting a 2-by-2 filter with a stride value of two during the pooling process of step 336.

Further, step 338, carried out by the fully connected layer, includes flattening the compressed matrix, converting the matrix to an n-dimensional vector, and connecting the same to a neural network. In at least one example embodiment, two layers of a neural network can be used in connection with a softmax activation function for multinomial classification performed in connection with step 338.

Figure 4:
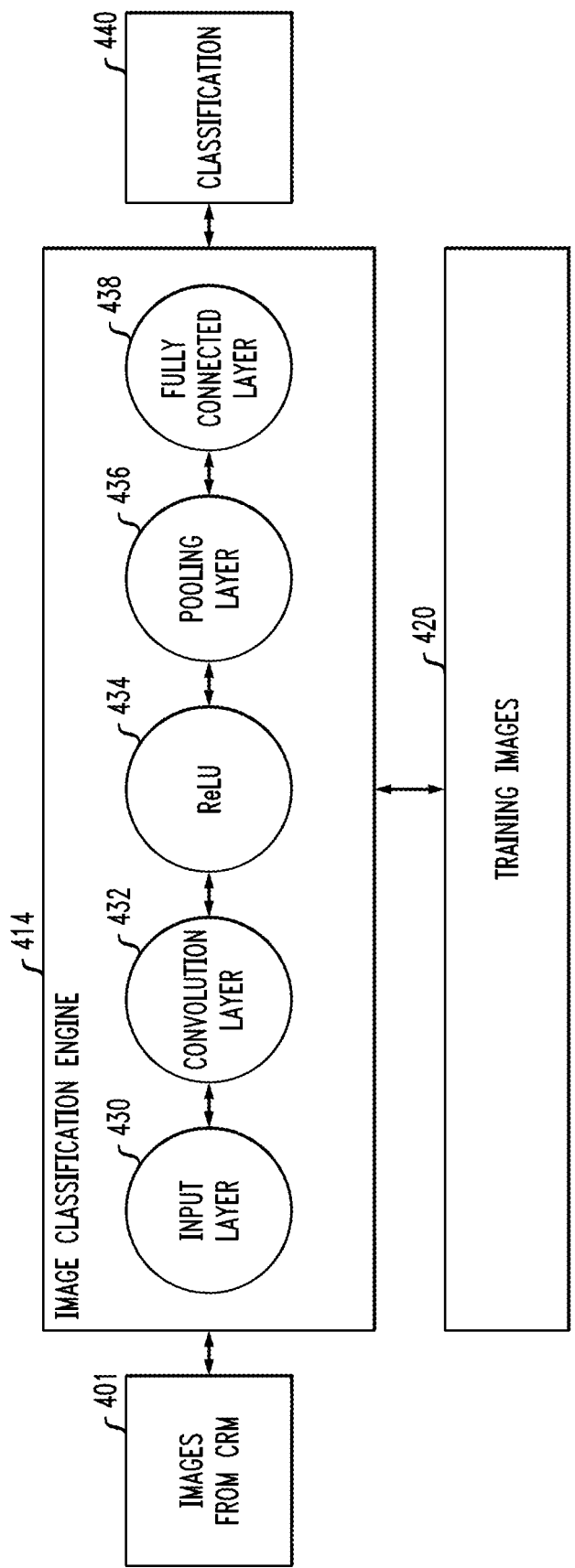
FIG. 4 shows an example image classification workflow in connection with an image classification engine in an illustrative embodiment.

One or more of the steps and layers depicted in FIG. 3 are also illustrated in connection with image classification engine in FIG. 4. As such, FIG. 4 shows an example image classification workflow in connection with image classification engine 414 in an illustrative embodiment. Specifically, FIG. 4 depicts image classification engine 414 processing images 401 from at least one customer in a CRM system, wherein such processing includes actions (such as, for example, detailed in connection with FIG. 3) being carried out by input layer 430, convolution layer 432, ReLU layer 434, pooling layer 436, and fully connected layer 438. By way of example, such processing includes using a filter on the input matrix, passing the matrix through at least one non-linear function to remove negative values, and using one or more features from one or more of the layers of the image classification engine 414 to generate a classification 440 of the input image (e.g., a product-related image, a shipping box image, a defect-related image, a communications-related image, etc.) based at least in part on training images 420.

Figure 5:
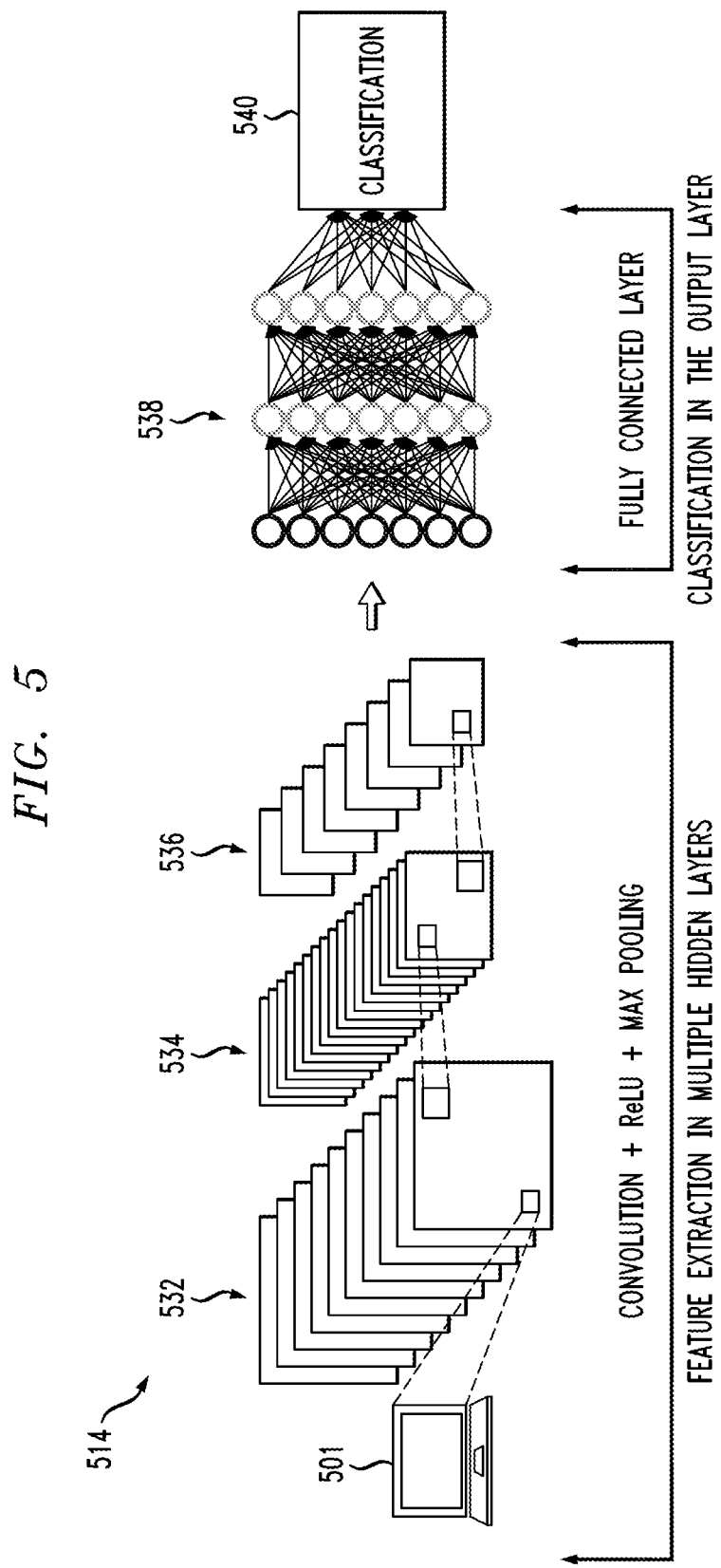
FIG. 5 shows an example image classification workflow in connection with a CNN classifier in an illustrative embodiment.

FIG. 5 shows an example image classification workflow in connection with a CNN classifier 514 in an illustrative embodiment. By way of illustration, FIG. 5 depicts CNN classifier 514 (which can represent at least a portion of image classification engine 114 and/or 414), which includes a feature extraction phase and a classification phase. The feature extraction phase includes processing an input image 501 using multiple hidden layers including convolution layer 532, ReLU layer 534, and max pooling layer 536. The output of this feature extraction phase is then processed in the classification phase, specifically using fully connected layer 538 (also referred to herein as the output layer) to generate at least one classification 540.

By way of further illustration, portions of one or more embodiments are depicted in connection with the example code snippets depicted in FIG. 6 through FIG. 11, which can be implemented, e.g., using Keras with Tensorflow backend, Python language, Pandas, Numpy and ScikitLearn libraries.

FIG. 6 shows an example code snippet for data preprocessing in an illustrative embodiment. In this embodiment, example code snippet 600 is executed by or under the control of at least one processing system and/or device. For example, the example code snippet 600 may be viewed as comprising a portion of a software implementation of at least part of automated image classification and storage determination system 105 of the FIG. 1 embodiment.

The example code snippet 600 illustrates data preprocessing steps including importing libraries to be implemented in connection with carrying out one or more embodiments, including Keras, Tensorflow, Pandas and Numpy, etc.

It is to be appreciated that this particular example code snippet shows just one example implementation of data preprocessing, and alternative implementations of the process can be used in other embodiments.

FIG. 7 shows an example code snippet for loading training images and labels in an illustrative embodiment. In this embodiment, example code snippet 700 is executed by or under the control of at least one processing system and/or device. For example, the example code snippet 700 may be viewed as comprising a portion of a software implementation of at least part of automated image classification and storage determination system 105 of the FIG. 1 embodiment.

The example code snippet 700 illustrates loading training images and labels related thereto (e.g., class(es) of the images). Assuming, for example, that the training images and related labels are stored separately (e.g., in a given drive), then the training images and related labels are read into two separate data frames.

It is to be appreciated that this particular example code snippet shows just one example implementation of training image loading, and alternative implementations of the process can be used in other embodiments.

FIG. 8 shows an example code snippet for converting labels into vectors in an illustrative embodiment. In this embodiment, example code snippet 800 is executed by or under the control of at least one processing system and/or device. For example, the example code snippet 800 may be viewed as comprising a portion of a software implementation of at least part of automated image classification and storage determination system 105 of the FIG. 1 embodiment.

The example code snippet 800 illustrates converting labels into vectors. As labels are typically text-based in nature (for example "Product," "Defect," "Communication," etc.), and machine learning algorithms commonly process vectors and/or numbers, one or more embodiments include encoding the labels for converting into vectors, which can be carried out using one-hot vectors and/or a label binarizer in a ScikitLearn library.

It is to be appreciated that this particular example code snippet shows just one example implementation of converting labels into vectors, and alternative implementations of the process can be used in other embodiments.

FIG. 9 shows an example code snippet for processing datasets in an illustrative embodiment. In this embodiment, example code snippet 900 is executed by or under the control of at least one processing system and/or device. For example, the example code snippet 900 may be viewed as comprising a portion of a software implementation of at least part of automated image classification and storage determination system 105 of the FIG. 1 embodiment.

The example code snippet 900 illustrates splitting the prepared dataset into a training subset and a test data subset for model training and validation. Such splitting can be achieved, for example, using a ScikitLearn library.

It is to be appreciated that this particular example code snippet shows just one example implementation of splitting datasets, and alternative implementations of the process can be used in other embodiments.

FIG. 10 shows example code snippets for building a CNN model in an illustrative embodiment. In this embodiment, example code snippets 1000-a and 1000-b are executed by or under the control of at least one processing system and/or device. For example, example code snippets 1000-a and 1000-b may be viewed as comprising a portion of a software implementation of at least part of automated image classification and storage determination system 105 of the FIG. 1 embodiment.

The example code snippets 1000-a and 1000-b illustrate creating a multi-layer CNN model using a Keras library. Using the function Sequential( ) a shell model is created, and then individual layers are added by calling the add( ) function of the model and passing an instance of Dense( ) to indicate that a dense neural network is being created. Accordingly, in such an embodiment, all of the neurons in each layer will connect with all of the neurons from the preceding layer and the following layer. The Dense( ) function will accept parameters for the number of neurons on that layer, the type of activation function used, and if there are any kernel parameters. Multiple hidden layers are added by calling the same add( ) function to the model, and once the model is created, a loss function, an optimizer type, and one or more validation metrics are added to the model using a compile( ) function. In at least one embodiment, considering a multi-class classification is needed and/or desired, "Categorical_crossentropy" is used as the loss function, Adam is used as the optimizer, and "accuracy" is used as at least one of the metrics.

It is to be appreciated that this particular example code snippet shows just one example implementation of building a CNN model, and alternative implementations of the process can be used in other embodiments.

FIG. 11 shows an example code snippet for training and implementing a CNN model in an illustrative embodiment. In this embodiment, example code snippets 1100-a and 1100-b are executed by or under the control of at least one processing system and/or device. For example, the example code snippets 1100-a and 1100-b may be viewed as comprising a portion of a software implementation of at least part of automated image classification and storage determination system 105 of the FIG. 1 embodiment.

The example code snippets 1100-a and 1100-b illustrate steps for model training, model validation, model optimization, and model execution (e.g., generating a prediction). CNN model training is achieved by calling the fit( ) function of the model and passing training data and the number of epochs. After the model completes the specified number of epochs, the model is trained and ready for validation. In at least one embodiment, if the model achieves a certain loss/error threshold, early stopping can be done to stop training early instead of completing all epochs. The loss/error value can be obtained by calling the evaluate( ) function of the model and passing test data. This loss/error value indicates how well the model is trained; a higher loss value indicates that the model is not sufficiently trained, and hyperparameter tuning is required. For example, the number of epochs can be increased to train the model more. Other hyperparameter tuning can be done by changing the loss function, changing the optimizer algorithm, and/or making changes to the neural network architecture by adding one or more hidden layers.

Once the model is fully trained with a reasonable value of loss (e.g., as close to 0 as possible), the model is ready for execution (e.g., generating a prediction). Prediction by the model is achieved by calling the predict( ) function of the model and passing the independent variables of the test data (e.g., for comparing training data against testing data) and/or the real values that need to be predicted (which can include the class of the input image (e.g., the target variable)).

It is to be appreciated that this particular example code snippet shows just one example implementation of training and implementing a CNN model, and alternative implementations of the process can be used in other embodiments.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

Figure 12:
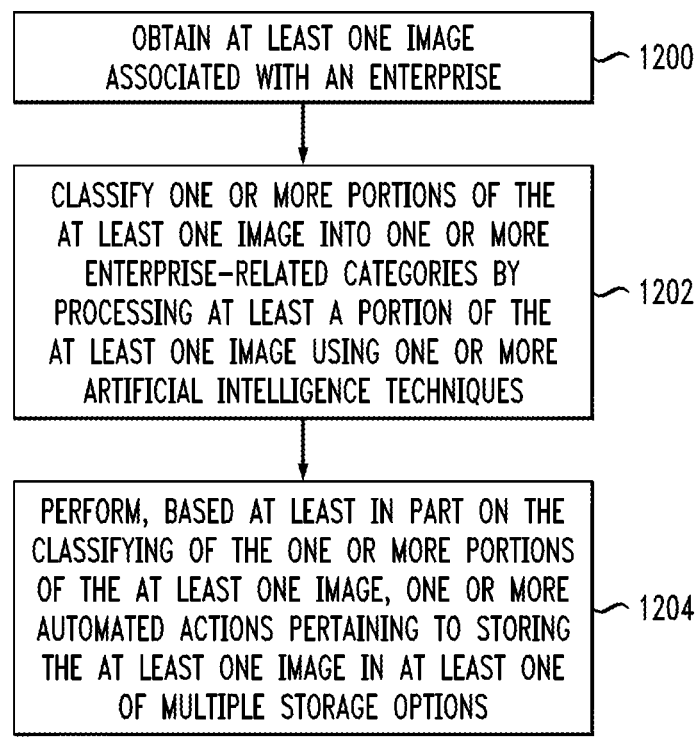
FIG. 12 is a flow diagram of a process for automatically classifying images for storage-related determinations using artificial intelligence techniques in an illustrative embodiment.

FIG. 12 is a flow diagram of a process for automatically classifying images for storage-related determinations using artificial intelligence techniques in an illustrative embodiment. It is to be understood that this particular process is only an example, and additional or alternative processes can be carried out in other embodiments.

In this embodiment, the process includes steps 1200 through 1204. These steps are assumed to be performed by the automated image classification and storage determination system 105 utilizing elements 112, 114 and 116.

Step 1200 includes obtaining at least one image associated with an enterprise. In at least one embodiment, obtaining at least one image associated with an enterprise includes obtaining the at least one image from a customer relationship management system associated with the enterprise.

Step 1202 includes classifying one or more portions of the at least one image into one or more enterprise-related categories by processing at least a portion of the at least one image using one or more artificial intelligence techniques. In one or more embodiments, processing at least a portion of the at least one image includes processing at least a portion of the at least one image using at least one convolutional neural network. In such an embodiment, processing at least a portion of the at least one image using at least one convolutional neural network includes processing at least a portion of the at least one image using at least one convolutional neural network comprising at least one input layer, at least one convolution layer, at least one rectified linear unit layer, at least one pooling layer, and at least one fully connected layer.

Also, in such an embodiment, processing at least a portion of the at least one image using the at least one convolutional neural network can include processing, using the at least one input layer, at least a portion of the at least one image as an input matrix comprising one or more pixel values, and creating a condensed version of the at least one image, using the at least one convolutional layer, by selecting a sub-matrix within the input matrix, scanning, using the sub-matrix, at least a portion of the input matrix, beginning at the top-left pixel of the matrix, and multiplying, in connection with the scanning, one or more pixel values of the sub-matrix by one or more pixel values of the input matrix.

Further, at least one embodiment can include increasing, using the at least one rectified linear unit layer, non-linearity of the condensed version of the at least one image by removing one or more negative values from the condensed version of the at least one image and activating at least one neuron within the at least one convolutional neural network. Such an embodiment can also include downsampling, using the at least one pooling layer, the condensed version of the at least one image, in connection with height and width, by using one or more max pooling techniques, flattening, using the fully connected layer, a matrix associated with the condensed version of the at least one image, and converting the matrix associated with the condensed version of the at least one image to an n-dimensional vector.

Step 1204 includes performing, based at least in part on the classifying of the one or more portions of the at least one image, one or more automated actions pertaining to storing the at least one image in at least one of multiple storage options. In at least one embodiment, performing one or more automated actions pertaining to storing the at least one image includes automatically archiving the at least one image in cloud storage based at least in part on the classifying of the one or more portions of the at least one image. Also, in one or more embodiments, performing one or more automated actions pertaining to storing the at least one image includes automatically migrating the at least one image to on-premise storage associated with the enterprise based at least in part on the classifying of the one or more portions of the at least one image. Additionally or alternatively, performing one or more automated actions pertaining to storing the at least one image can include automatically deleting the at least one image based at least in part on the classifying of the one or more portions of the at least one image.

In one or more embodiments, the techniques depicted in FIG. 12 can also include automatically training at least a portion of the one or more artificial intelligence techniques based at least in part on results of the classifying of the one or more portions of the at least one image.

Accordingly, the particular processing operations and other functionality described in conjunction with the flow diagram of FIG. 12 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically classify images in connection with enterprise-related storage determinations using artificial intelligence techniques. These and other embodiments can effectively overcome problems associated with resource-intensive storage of image data and time-intensive searching requirements associated with such stored data.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 13 and 14. Although described in the context of system 100, these platforms may also be used to implement at least portions of other information processing systems in other embodiments.

Figure 13:
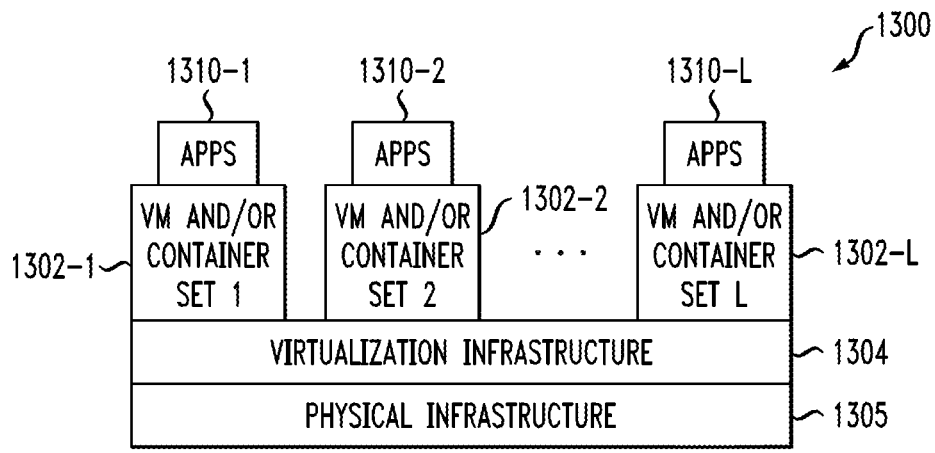
FIGS. 13 and 14 show examples of processing platforms that may be utilized to implement at least a portion of an information processing system in illustrative embodiments.
Figure 14:
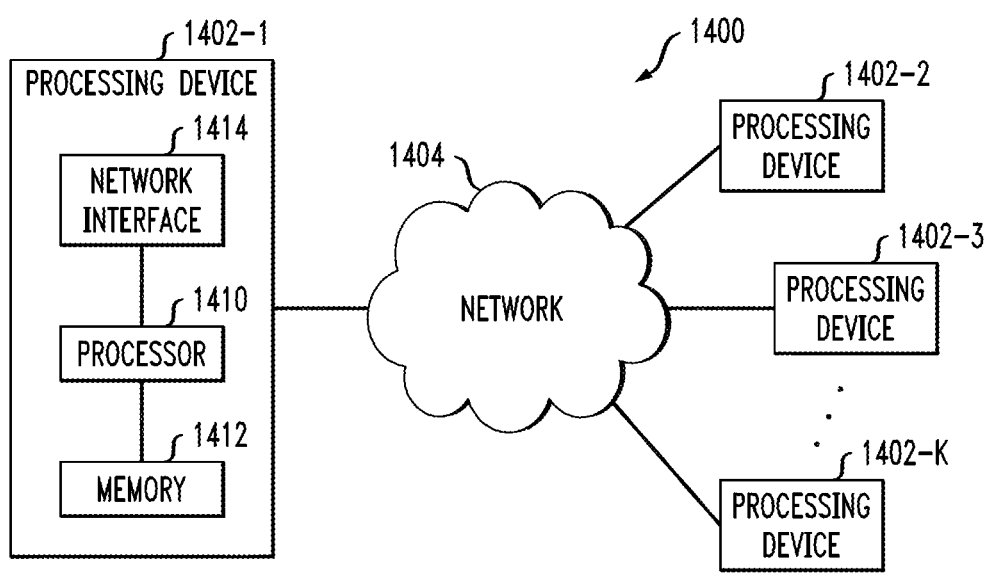

FIG. 13 shows an example processing platform comprising cloud infrastructure 1300. The cloud infrastructure 1300 comprises a combination of physical and virtual processing resources that are utilized to implement at least a portion of the information processing system 100. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 comprise respective VMs, respective sets of one or more containers, or respective sets of one or more containers running in VMs. In some implementations of the FIG. 13 embodiment, the VMs/container sets 1302 comprise respective VMs implemented using virtualization infrastructure 1304 that comprises at least one hypervisor.

A hypervisor platform may be used to implement a hypervisor within the virtualization infrastructure 1304, wherein the hypervisor platform has an associated virtual infrastructure management system. The underlying physical machines comprise one or more information processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1402-1 in the processing platform 1400 comprises a processor 1410 coupled to a memory 1412.

The processor 1410 comprises a microprocessor, a CPU, a GPU, a TPU, a microcontroller, an ASIC, a FPGA or other type of processing circuitry, as well as portions or combinations of such circuitry elements.

The memory 1412 comprises random access memory (RAM), read-only memory (ROM) or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining at least one image associated with an enterprise;
   classifying one or more portions of the at least one image into one or more of multiple enterprise-related categories by processing at least a portion of the at least one image using one or more artificial intelligence techniques, wherein the multiple enterprise-related categories include at least a first category that pertains to images related to one or more enterprise-related issues and a second category that pertains to images unrelated to the one or more enterprise-related issues; and performing, based at least in part on the classifying of the one or more portions of the at least one image, one or more automated actions pertaining to storing the at least one image in at least one of multiple storage options, wherein performing one or more automated actions pertaining to storing the at least one image comprises automatically archiving at least one or more portions of the at least one image, classified into the first category of the multiple enterprise-related categories, in cloud storage for at least a first amount of time determined in accordance with a first one of a plurality of storage-related rules, and automatically storing at least one or more separate portions of the at least one image, classified into the second category of the multiple enterprise-related categories, in on-premise storage associated with the enterprise for at least a second amount of time determined in accordance with a second one of the plurality of storage-related rules;

wherein the method is performed by at least one processing device comprising a processor coupled to a memory.

2. The computer-implemented method of claim 1, wherein performing one or more automated actions pertaining to storing the at least one image comprises automatically deleting the at least one image based at least in part on the classifying of the one or more portions of the at least one image.

3. The computer-implemented method of claim 1, further comprising:

automatically training at least a portion of the one or more artificial intelligence techniques based at least in part on results of the classifying of the one or more portions of the at least one image.

4. The computer-implemented method of claim 1, wherein processing at least a portion of the at least one image comprises processing at least a portion of the at least one image using at least one convolutional neural network.

5. The computer-implemented method of claim 4, wherein processing at least a portion of the at least one image using at least one convolutional neural network comprises processing at least a portion of the at least one image using at least one convolutional neural network comprising at least one input layer, at least one convolution layer, at least one rectified linear unit layer, at least one pooling layer, and at least one fully connected layer.

6. The computer-implemented method of claim 5, wherein processing at least a portion of the at least one image using the at least one convolutional neural network comprises processing, using the at least one input layer, at least a portion of the at least one image as an input matrix comprising one or more pixel values.

7. The computer-implemented method of claim 6, wherein processing at least a portion of the at least one image using the at least one convolutional neural network comprises creating a condensed version of the at least one image, using the at least one convolutional layer, by:

selecting a sub-matrix within the input matrix;

scanning, using the sub-matrix, at least a portion of the input matrix, beginning at a top-left pixel of the matrix; and multiplying, in connection with the scanning, one or more pixel values of the sub-matrix by one or more pixel values of the input matrix.

8. The computer-implemented method of claim 7, wherein processing at least a portion of the at least one image using the at least one convolutional neural network comprises increasing, using the at least one rectified linear unit layer, non-linearity of the condensed version of the at least one image by removing one or more negative values from the condensed version of the at least one image and activating at least one neuron within the at least one convolutional neural network.

9. The computer-implemented method of claim 7, wherein processing at least a portion of the at least one image using the at least one convolutional neural network comprises downsampling, using the at least one pooling layer, the condensed version of the at least one image, in connection with height and width, by using one or more max pooling techniques.

10. The computer-implemented method of claim 7, wherein processing at least a portion of the at least one image using the at least one convolutional neural network comprises, using the fully connected layer, flattening a matrix associated with the condensed version of the at least one image, and converting the matrix associated with the condensed version of the at least one image to an n-dimensional vector.

11. The computer-implemented method of claim 1, wherein obtaining at least one image associated with an enterprise comprises obtaining the at least one image from a customer relationship management system associated with the enterprise.

12. A non-transitory processor-readable storage medium having stored therein program code of one or more software programs, wherein the program code when executed by at least one processing device causes the at least one processing device:

to obtain at least one image associated with an enterprise;

to classify one or more portions of the at least one image into one or more of multiple enterprise-related categories by processing at least a portion of the at least one image using one or more artificial intelligence techniques, wherein the multiple enterprise-related categories include at least a first category that pertains to images related to one or more enterprise-related issues and a second category that pertains to images unrelated to the one or more enterprise-related issues; and to perform, based at least in part on the classifying of the one or more portions of the at least one image, one or more automated actions pertaining to storing the at least one image in at least one of multiple storage options, wherein performing one or more automated actions pertaining to storing the at least one image comprises automatically archiving at least one or more portions of the at least one image, classified into the first category of the multiple enterprise-related categories, in cloud storage for at least a first amount of time determined in accordance with a first one of a plurality of storage-related rules, and automatically storing at least one or more separate portions of the at least one image, classified into the second category of the multiple enterprise-related categories, in on-premise storage associated with the enterprise for at least a second amount of time determined in accordance with a second one of the plurality of storage-related rules.

13. The non-transitory processor-readable storage medium of claim 12, wherein performing one or more automated actions pertaining to storing the at least one image comprises automatically deleting the at least one image based at least in part on the classifying of the one or more portions of the at least one image.

14. An apparatus comprising:
at least one processing device comprising a processor coupled to a memory;
the at least one processing device being configured:
to obtain at least one image associated with an enterprise;
to classify one or more portions of the at least one image into one or more of multiple enterprise-related categories by processing at least a portion of the at least one image using one or more artificial intelligence techniques, wherein the multiple enterprise-related categories include at least a first category that pertains to images related to one or more enterprise-related issues and a second category that pertains to images unrelated to the one or more enterprise-related issues; and
to perform, based at least in part on the classifying of the one or more portions of the at least one image, one or more automated actions pertaining to storing the at least one image in at least one of multiple storage options, wherein performing one or more automated actions pertaining to storing the at least one image comprises automatically archiving at least one or more portions of the at least one image, classified into the first category of the multiple enterprise-related categories, in cloud storage for at least a first amount of time determined in accordance with a first one of a plurality of storage-related rules, and automatically storing at least one or more separate portions of the at least one image, classified into the second category of the multiple enterprise-related categories, in on-premise storage associated with the enterprise for at least a second amount of time determined in accordance with a second one of the plurality of storage-related rules.

15. The apparatus of claim 14, wherein performing one or more automated actions pertaining to storing the at least one image comprises automatically deleting the at least one image based at least in part on the classifying of the one or more portions of the at least one image.

16. The apparatus of claim 14, wherein processing at least a portion of the at least one image comprises processing at least a portion of the at least one image using at least one convolutional neural network.

17. The apparatus of claim 16, wherein processing at least a portion of the at least one image using at least one convolutional neural network comprises processing at least a portion of the at least one image using at least one convolutional neural network comprising at least one input layer, at least one convolution layer, at least one rectified linear unit layer, at least one pooling layer, and at least one fully connected layer.

18. The apparatus of claim 17, wherein processing at least a portion of the at least one image using the at least one convolutional neural network comprises processing, using the at least one input layer, at least a portion of the at least one image as an input matrix comprising one or more pixel values.

19. The apparatus of claim 18, wherein processing at least a portion of the at least one image using the at least one convolutional neural network comprises creating a condensed version of the at least one image, using the at least one convolutional layer, by:
selecting a sub-matrix within the input matrix;
scanning, using the sub-matrix, at least a portion of the input matrix, beginning at a top-left pixel of the matrix; and
multiplying, in connection with the scanning, one or more pixel values of the sub-matrix by one or more pixel values of the input matrix.

20. The apparatus of claim 19, wherein processing at least a portion of the at least one image using the at least one convolutional neural network comprises increasing, using the at least one rectified linear unit layer, non-linearity of the condensed version of the at least one image by removing one or more negative values from the condensed version of the at least one image and activating at least one neuron within the at least one convolutional neural network.

* * * * *